United States Patent [19]
Christena

[11] 3,975,348
[45] Aug. 17, 1976

[54] WATER-EXTENDED POLYESTERAMIDE RESINS AND METHODS FOR THEIR PRODUCTION

[75] Inventor: Ray C. Christena, Wichita, Kans.

[73] Assignee: Vulcan Materials Company, Birmingham, Ala.

[22] Filed: Dec. 7, 1973

[21] Appl. No.: 422,862

[52] U.S. Cl. .................. 260/29.6 NR; 260/2.5 N; 260/16; 260/22 R; 260/29.2 N; 260/29.6 R; 260/75 N; 260/861; 260/863; 260/864; 260/866; 260/870
[51] Int. Cl.² .......................................... C08L 67/06
[58] Field of Search ............. 260/29.6 NR, 29.6 R, 260/29.2 N, 75 N, 22 R, 2.5 N

[56] References Cited
UNITED STATES PATENTS

| 3,256,219 | 6/1966 | Will | 260/29.6 NR |
| 3,629,169 | 12/1971 | Bedighian | 260/29.6 NR |
| 3,676,291 | 7/1972 | Christena et al | 260/75 N |
| 3,687,883 | 8/1972 | Korf | 260/29.6 NR |
| 3,779,966 | 12/1973 | Weeks et al | 260/29.6 NR |
| 3,787,282 | 1/1974 | Christena et al | 260/75 N |

Primary Examiner—Harold D. Anderson
Attorney, Agent, or Firm—Burns, Doane, Swecker & Mathis

[57] ABSTRACT

Water-extended polyesteramides are produced by forming a water-in-oil emulsion of the polyesteramide and thereafter curing the polyesteramide emulsion. When halogen-containing polyesteramides are used, a synergistic fire-retardancy effect is achieved. Substantially water-insoluble metal oxides, such as zinc oxide and magnesium oxide, are used as emulsifying agents to produce room temperature curable polyesteramide and polyester emulsions which, after curing, have desirable hardness and fire-retardancy characteristics.

7 Claims, No Drawings

WATER-EXTENDED POLYESTERAMIDE RESINS AND METHODS FOR THEIR PRODUCTION

BACKGROUND OF THE INVENTION

1. Field of the Invention

This invention relates to the production of water-extended polyesteramide resins.

2. Summary of the Prior Art

Water-extended resins are a known class of cellular or porous polymeric compositions. See, for example, the articles by Leitheiser et al in Reinforced Plastics, May, 1968, pp. 260–263 and in SPE Journal, 25, pp. 41–45 (October 1969). In these water-extended resins, minute droplets of water are initially incorporated into a matrix of the resin. Besides substantially reducing material costs, other advantages resulting from the ability to disperse water in resins include reduced flammability, i.e., increased fire retardancy, reduced exothermic curing temperatures, lower product densities, and a porous or foam-like structure which is useful for a variety of purposes. Water-extended resins are useful as materials of construction, including fire walls, moldings and castings, paving and flooring applications, and conduits.

Water-extended resins have been made by the polymerization of water-insoluble vinyl monomers in a water-in-oil (W/O) type emulsion, i.e., an inverted emulsion where water forms the discontinuous or dispersed phase and the vinyl monomer forms the continuous phase or matrix. As described, for example, in U.S. Pat. Nos. 3,255,127, 3,256,219 and 3,442,842, water-extended polyester resins have been made by forming a water-in-oil emulsion of an unsaturated polyester resin and styrene, with or without the use of an auxiliary emulsifier, such as a poly(ethylene oxide) type emulsifier. Without the use of auxiliary emulsifying agents, however, reverse emulsions of relatively low water content are produced. Even when auxiliary poly(ethylene oxide) type emulsifying agents are used, difficulties are encountered in in sufficiently emulsifying the water so that most of the water initially added is lost during the polymerization of the unstable emulsion. As described by Horie et al in *Journal of Applied Polymer Science*, Vol. 11, pp. 57–71 (1967), copolymerization of unsaturated polyester resin with styrene in water-in-oil type emulsions has been carried out with the use of various basic compounds, having a $pK_a$ above 6, such as triethanolamine, sodium hydroxide or calcium hydroxide, as emulsifiers. However, the use of organic nitrogen-containing emulsifiers such as triethanolamine has been found to be incompatible with room temperature curing systems such as methyl ethyl ketone peroxide and cobalt octoate. When inorganic bases such as sodium hydroxide or calcium hydroxide are used, the resulting water-extended polyester after curing, is softer, thus limiting its utility for those applications where hardness of the cured resin is not important.

SUMMARY OF THE INVENTION

Accordingly, a primary object of this invention is to provide water-extended resins and processes for their production which substantially alleviate the above-discussed disadvantages of the prior art, or do not incur them altogether.

A more particular object of the invention is to provide novel water-extended polyesteramides and processes for their production.

Another object is to provide novel water-extended halogen-containing polyesteramide compositions having improved fire-retardancy and processes for their production.

Still another object is to provide novel polyester and polyesteramide water-in-oil emulsions which are stable and which can have a high water content, and processes for their production.

A further object is to provide novel water-extended polyester and polyesteramide compositions which can be cured at room temperature and which have improved hardness values after curing, as well as processes for their production.

Other and more particular objects of the invention will become apparent to one skilled in the art from the following summary of the invention and description of the preferred embodiments:

In accordance with one aspect of the invention, water-in-oil emulsions of polyesteramides are provided or produced by mixing the polyesteramide with water and an emulsifying agent. Water-extended polyesteramide resin compositions can then be produced from the emulsions by curing, i.e., solidifying or hardening the emulsion through a cross-linking reaction. A primary feature of this aspect of the invention is the improved stability and uniformity of the polyesteramides emulsions and the relative ease in which they are formed.

In another more particular aspect of the invention, these polyesteramide water-in-oil emulsions and water-extended resins are produced from halogen-containing polyesteramides.

A primary feature of this more particular aspect of the invention is the synergistic fire-retardancy achieved by water-extending a halogen-containing polyesteramide composition. That is, fire-retardancy of the water-extended halogen-containing polyesteramide has been found to be greater than one would predict from the fire-retardant properties either a halogen-containing polyesteramide which has not been water-extended or a water-extended polyesteramide which is not halogen-containing.

In accordance with a further aspect of the invention, substantially water insoluble metal oxides such as zinc oxide and magnesium oxide have been found useful as emulsifiers or emulsifying agents for the production of water-in-oil emulsions of polymerizable organic liquids, such as solutions of polyesteramides or polyesters in vinylic cross-linking agents such as styrene.

A primary feature of this aspect of the invention is the compatibility of these metal oxide emulsifiers with room-temperature-curing systems and their ability to impart improved hardness characteristics to the cured composition. Also, the use of these metal oxide emulsifiers has been found to further enhance the fire-retardancy of the cured water-extended compositions.

These and other aspects and advantages of the invention will become more fully apparent to one skilled in the art from the following description of the preferred embodiments.

DESCRIPTION OF THE PREFERRED EMBODIMENT

A. PREPARATION OF POLYESTERAMIDE RESINS

The polyesteramides from which the water-extended resins described herein are produced, can be made, for example, by the processes described and claimed in U.S. Pat. No. 3,676,424, "Aziridine Salts of Dibasic Acids", U.S. Pat. No. 3,676,291, "Polyesteramides", U.S. Pat. No. 3,772,299 "Production of Polyesteramides from Aziridine Salts", filed July 22, 1971, and copending U.S. Ser. No. 190,819, "Improved Polyesteramides and Process Therefor", filed Oct. 20, 1971 now U.S. Pat. No. 3,787,282, all of which are assigned to the assignee of the present invention and which are hereby incorporated by reference.

The processes for preparing the polyesteramides disclosed in U.S. Pat. Nos. 3,676,291, 3,676,424, and U.S. Pat. No. 3,772,299 involve reacting an aziridine salt of a dibasic acid with a polyhydric alcohol and either a polycarboxylic acid or polycarboxylic acid anhydride.

The aziridine salt is of the form indicated in Formula I:

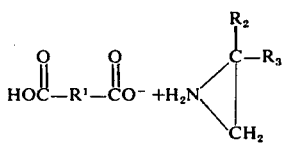   I wherein $R^1$ is alkylene, cycloalkylene, cycloalkenylene, arylene, or aralkylene, wherein one or all of the hydrogen atoms thereof can be substituted with one or more members selected from the group consisting of F, Cl, Br, lower alkyl, and lower alkoxy; and $R^2$ and $R^3$ are independently selected from the group consisting of hydrogen, alkyl, and aryl, In a preferred embodiment, wherein the salts are especially useful to produce flame retardant polyesteramides as described more completely below, $R^1$ is tetrachlorophenylene, tetrabromophenylene, or a radical of Formula II:

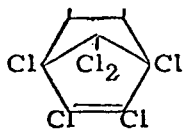   II by which is meant the residue of 1,4,5,6,7,7,-hexachlorobicyclo[2.2.1]-5-heptene-2,3-dicarboxylic acid commercially available as Chlorendic acid or Het acid. In this embodiment $R^2$ is hydrogen or methyl and $R^3$ is hydrogen.

The salts of Formula I are produced by reacting a dicarboxylic acid of Formula III:

   III with an aziridine compound of Formula IV:

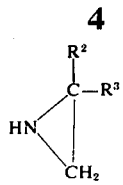   IV wherein $R^1$, $R^2$ and $R^3$ have the above described meanings. The reaction to form the aziridine salt is most conveniently effected by simply adding the aziridine compound to the acid at any convenient temperature, but generally between −20°C and 100°C and preferably between 0°C and 50°C. At lower temperatures, the reaction proceeds at an uneconomically slow rate whereas at higher temperatures the salt tends to rearrange to an amino ester or hydroxy amide. The reaction is preferably conducted in the presence of a suitable solvent which is inert to the acid and the aziridine compound. Examples of suitable solvents include among others, ethanol, methanol, and acetone, which is preferred. The solvent may be present in any amount up to infinite dilution. The aziridine is preferably added to the acid in a molar ratio of 10:10 although slightly varying molar ratios such as 10:11 to 11:10 can also be employed. At lower molar ratios insufficient aziridine is present in order to completely convert the acid to the salt of Formula I whereas at greater ratios competing side reactions may occur, undesirably reducing the yield of the salt.

The acids of Formula III should be free of non-benzenoid unsaturation, in order to inhibit undesirable reactions with the aziridine compound. For example, maleic acid is not within the scope of acids of Formula III.

Unlike many reactions employing dicarboxylic acids, in this reaction the acid anhydrides are not equivalents and the term "acid" employed in connection with the acids of Formula I is meant to refer to the acid containing two carboxyl groups and not to the corresponding anhydride. Examples of suitable acids of Formula III include among others malonic acid, succinic acid, glutaric acid, adipic acid, 1,8-naphthalenedicarboxylic acid, araliphatic dicarboxylic acids such as p,p′benzophenonedicarboxylic acid, and 3-methyl phthalic acid, hemipinic acid, 3-bromophthalic acid, 4-chloroisophthalic acid, tetrabromophthalic acid, tetrachlorophthalic acid, and chloroendic acid.

Examples of suitable aziridine compounds include among others ethyleneimine (aziridine), 2-methyl aziridine, 2-phenyl aziridine, 2,2-dimethyl aziridine, 2-benzyl aziridine and 2-dodecyl aziridine. Ethyleneimine is preferred because of cost, availability, and reactivity, although 2-methyl aziridine has also been found to be suitable for certain specialized applications.

In the broadest aspects of the present invention, the polyesteramides employed may be made by reacting a salt as defined by Formula I with any polycarboxylic acid or anhydride and any polyhydric alcohol.

Dicarboxylic acids and anhydrides are preferred when it is desired to produce linear polyesteramides. Examples of certain dicarboxylic acids free of non-benzenoid unsaturation are given above. Their corresponding anhydrides such as phthalic anhydride can also be employed. In an especially preferred embodiment of the present invention, the dicarboxylic acid or anhydride is alpha-beta ethylenically unsaturated in order to render the polyesteramide cross-linkable with a vinyl monomer. Examples of suitable alpha-beta unsaturated dicarboxylic acids include among others glutaconic acid, itaconic acid, citraconic acid, mesaconic acid, fumaric acid and maleic acid which is preferred. Tri- or higher functional acids such as trimesic acid may be employed when it is desired to produce a branched or cross-linked polyesteramide.

Any polyhydric alcohol may be employed; although the dihydric alcohols are preferred when it is desired to produce linear polyesteramides.

Examples of suitable polyhydric alcohols include, among others, ethylene glycol, diethylene glycol, 1,2-propylene glycol, dipropylene glycol, dipropylene glycol, 1,3-propylene glycol, 1,3-butylene glycol, 1,2-butylene glycol, neopentyl glycol, 1,3-pentanediol, 1,2-butenediol, and 1,5-pentanediol. Higher polyhydric alcohols, such as trimethylol propane and pentaerythritol, which do not materially alter the linear nature of the polyesteramide, can be used in minor amounts.

The polyesteramides may be produced by combining the salt, polycarboxylic acid (or anhydride), and polyhydric alcohol in a reaction vessel and heating the contents to any temperature above which the reaction proceeds at an economical rate and below which degradation of the reactants occur. This is generally between 0°C and 200°C and preferably between 40°C and 180°C. When it is desired to achieve a high molecular weight, the ratio of the polycarboxylic acid to the polyhydric alcohol is critical and generally is between 15:10 and 10:15 and preferably between 11:10 and 10:11. Since the salt of Formula I does not change the stoichiometry of the reaction, it can be employed in somewhat more widely varying molar ratios, but is generally present in a molar ratio of 10:1 to 1:10 and preferably 3:1 to 1:3 moles of salt per mole of polycarboxylic acid of Formula III.

In that preferred embodiment of the invention wherein the polyesteramides are intended to be self-extinguishing, a salt of a chlorinated or brominated acid is employed in an amount such that the total polyesteramide or its mixture with a vinyl monomer has a halogen content of greater than 10 weight percent and preferably greater than 20 weight percent. The reactants can be charged sequentially to the vessel, but are preferably charged simultaneously in order to produce a random polyesteramide. The reaction is continued until a stoichiometric amount of water has been removed or, more preferably, until the acid number of the reaction mixture has dropped to a value below 100, preferably below 50, and also until the amine number of the reaction mixture has dropped to a value below 20, preferably below 10.

Polyesteramides produced in accordance with that preferred embodiment of the present invention, employing an alpha-beta ethylenically unsaturated acid, can be cross-linked with copolymerizable vinylic monomers. Examples of suitable vinylic monomers include among others vinyl toluene, acrylic acid, methylacrylate, 2-ethylhexyl acrylate, acrylonitrile, methyl methacrylate, n-butyl acrylate, monochloro styrene, ethyl acrylate, ethyl methacrylate, acrolein, vinyl acetate, vinylidene chloride, vinyl chloride, vinyl bromide, and styrene, which is preferred.

Another group of polyesteramides which can be used for the purpose of the present invention are the improved polyesteramides disclosed in copending U.S. Ser. No. 190,819 now U.S. Pat. No. 3,787,282. In general, these improved polyesteramides are produced by reacting beta-propiolactone with an aziridine salt represented by the structural formula:

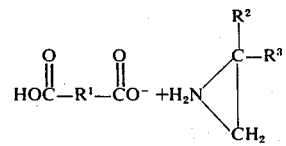

wherein $R^1$, $R^2$ and $R^3$ have the meanings given above, and with a polycarboxylic acid, such as maleic or dimer acid, with castor oil; or a polyhydric alcohol such as 1,6-hexane diol. The thus formed polyesteramide contains repeating units which may be represented by the structural formula:

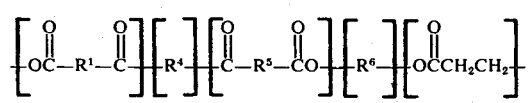

wherein $R^1$ has the meaning given above; $R^4$ represents a divalent radical such as aminoalkyleneoxy or oxyalkyleneamino;

$R^5$ represents a divalent radical such as alpha-beta ethylenically unsaturated alkenylene; and $R^6$ represents a divalent radical such as alkylene or alkenylene.

The following generalized equation illustrates the reaction which is thought to occur:

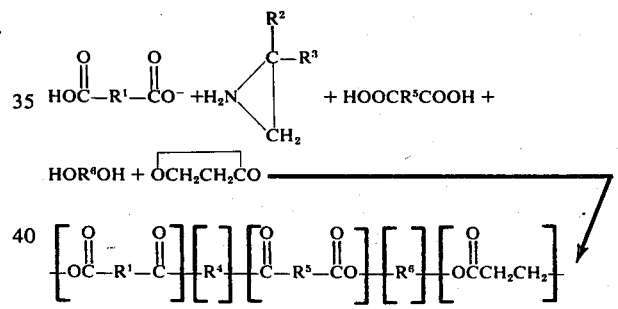

wherein $R^1$ represents a divalent radical such as alkylene, cycloalkylene, cycloalkylene, arylene, or aralkylene, wherein one or all of the hydrogen atoms thereof can be substituted with F, Cl, Br, lower alkyl and/or lower alkoxy; and where $R^2$, $R^3$ represents monovalent radicals such as hydrogen, alkyl or aryl;

$R^4$ represents a divalent radical such as aminoalkyleneoxy or oxyalkyleneamino;

$R^5$ represents a divalent organic radical such as alpha-beta ethylenically unsaturated alkenylene; and $R^6$ represents a divalent organic radical such as alkylene or alkenylene.

Preferably, $R^5$ is a divalent organic radical represented by the formula

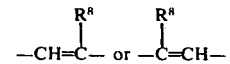

where $R^8$ is hydrogen or lower alkyl, preferably methyl. $R^8$ is most preferably hydrogen.

Preferably $R^6$ is lower alkylene or lower alkenylene.

The above aziridine salt can also be reacted with an acid represented by the structural formula

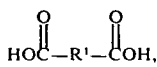

wherein $R^1$ has the meaning given above, to yield a diacid represented by the structural formula

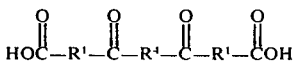

where $R^4$ has the meaning given above. The above diacid can then be reacted with beta-propiolactone, the polycarboxylic acid and the polyhydric alcohol to form an improved polyesteramide containing repeating units which may be represented by the structural formula

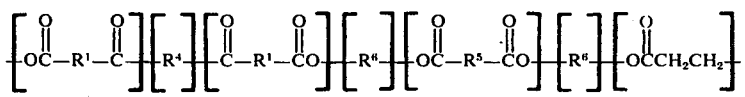

where $R^1$, $R^4$, $R^5$ and $R^6$ have the meanings given above.

Thus, the polyesteramides used in the present invention can also be formed by reacting an aziridine salt, a dicarboxylic acid $HOOCR^1COOH$ (which together are thought to react in situ to form the diacid $HOOCR^1COR^4COR^1COOH$), an alpha, beta-unsaturated dicarboxylic acid $HOOCR^5COOH$, a dihydric alcohol $HOR^6OH$, and beta-propiolactone according to the following generalized equation:

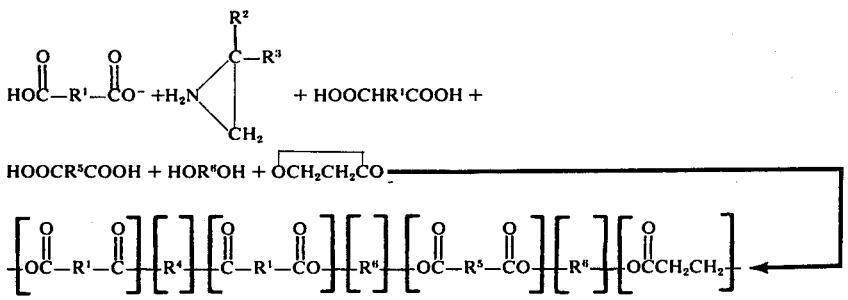

$R^1$, $R^2$, $R^3$, $R^4$, $R^5$ and $R^6$ have the meanings given above.

To summarize, the polyesteramides from which the water-in-oil emulsions and the cured water extended polyesteramides of the present invention are obtained comprise, in general, at least one member of the group consisting of (i) polyesteramides having repeating units represented by the structural formula

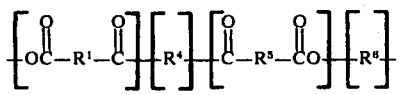

wherein:
$R^1$ is a divalent radical selected from the group consisting of alkylene, cycloalkylene, cycloalkylene, arylene, and aralkylene, wherein one or more of the hydrogen atoms thereof can be substituted by F, Cl, Br, lower alkyl and/or lower alkoxy;
$R^4$ is aminoalkyleneoxy or oxyalkyleneamino;
$R^5$ is alpha-beta ethylenically unsaturated alkenylene; and
$R^6$ is alkylene or alkenylene;
(ii) polyesteramides having repeating units represented by the structural formula

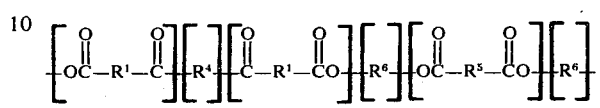

wherein $R^1$, $R^4$, $R^5$ and $R^6$ have the meanings given above; (iii) polyesteramides having repeating units represented by the structural formula

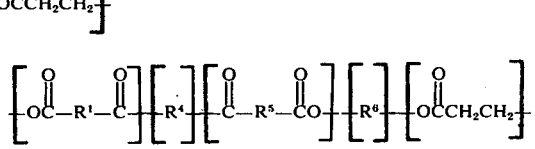

wherein $R^1$, $R^4$, $R^5$, and $R^6$ have the meanings given above; and (iv) polyesteramides having repeating units represented by the structural formula

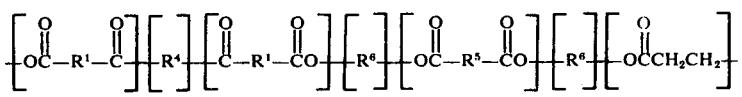

wherein:
$R^1$, $R^4$, $R^5$ and $R^6$ have the meanings given above.
To summarize further, in a preferred aspect of this invention, $R^1$ is tetrachlorophenylene, tetrabromophenylene or

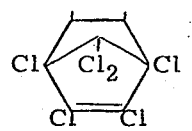

$R^4$ is

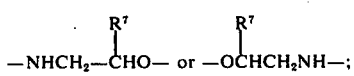

wherein $R^7$ is hydrogen or lower alkyl;
$R^5$ is

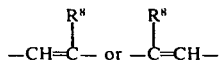

wherein $R^8$ is hydrogen or lower alkyl; and
$R^6$ is lower alkylene or lower alkenylene.

The above alkyl, alkylene and alkenylene groups or portions of the groups may contain, for example, from one to about fifteen carbon atoms. The above aryl and arylene groups or portions of the groups may contain, for example, from six to about eighteen carbon atoms.

The brackets in the above formulas are meant to indicate a linear polymer having recurring ester and amide linkages in the backbone thereof. The brackets are not meant to indicate that the reactants which produce these recurring units must necessarily be present in the most preferred equimolar ratio.

The polyesteramides are produced by combining the reactants in a reaction vessel and heating the contents to any temperature at which the reaction proceeds at an economical rate. This is generally between zero and 200°C and preferably between 40° and 180°C. When it is desired to achieve a high molecular weight, the ratio of the polycarboxylic acid to the polyhydric alcohol may be critical and generally is between 15:10 and 10:15 and preferably between 11:10 and 10:11. The aziridine salt and the diacid $HOOCR^1COR^4COR^1COOH$ may be employed in somewhat more widely varying ratios, but are generally present in a molar ratio of 10:1 to 1:10 and preferably 3:1 to 1:3 moles of salt to diacid per mole of dicarboxylic acid $HOOCR^5COOH$. The molar ratio of beta-propiolactone to aziridine salt or diacid may range from about 10:100 to 100:10, more typically from about 10:20 to 20:10, and preferably from about 10:15 to 15:10. In that preferred embodiment of the present invention wherein the polyesteramides are intended to be self-extinguishing, a salt of a chlorinated or brominated acid is employed in an amount such that the total polyesteramide or its mixture with a vinyl monomer has a halogen content of greater than 10 weight percent and preferably greater than 20 weight percent. The reactants can be charged sequentially to the vessel, but advantageously can be charged simultaneously in order to produce a random polyesteramide and maximize molecular weight, thus resulting in greater impact strength for the polyesteramide. When the reactants are not charged simultaneously, the diacid $HOOCR^1COR^4COR^1COOH$ is preferably used in lieu of the aziridine salt, and most preferably is generated or produced in situ from the aziridine salt, so as again to maximize molecular weight and impact strength. The use of the diacid, either by generating it in situ or by adding it directly to the reaction zone has also been found to improve color and storage stability of the resulting polyesteramides. The reaction is continued until a stoichiometric amount of water has been removed or, more preferably, until the acid number of the reaction mixture has dropped to a value below 100 and preferably below 50 and also until the amine number of the reaction mixture has dropped to a value below 20 and preferably below 10.

The reaction is usually conducted in the presence of an inert atmosphere of nitrogen, argon, or the like, under substantially oxygen-free conditions, i.e., an atmosphere containing less than 20 ppm oxygen and preferably less than 10 ppm oxygen. The reaction is conveniently conducted at atmospheric pressure; but, if desired, may be conducted at superatmospheric or subatmospheric pressures, and in a batch, semicontinuous, or continuous manner.

It will be apparent that various modifying agents such as fillers, e.g., carbon black, talc, etc. as well as heat and light stabilizers, dyes, and pigments can be incorporated into the polyesteramides without departing from the scope of the invention.

"Amine Number" is used herein refer to the value determined as follows:

Weigh out 1 to 2 g of polyesteramide in 200 ml Erlenmeyer flask. Add approximately 50 ml glacial acetic acid and dissolve sample. Titrate with 0.1 N $HClO_4$ using one drop of one percent crystal violet in glacial acetic acid as indicator. Titrate to first permanent green color.

$$\text{Amine Number} = \frac{10.046 \text{ (ml } 0.1 \text{ N } HClO_4)}{\text{Grams Sample}}$$

"Acid Number" is used herein to refer to the value determined as follows:

Weigh out 1 to 2 g of polyesteramide in 200 ml Erlenmeyer flask with 25 ml acetone. Titrate with 1 N Alcoholic KOH using phenolphthalein indicator.

$$\text{Acid Number} = \frac{5.61 \text{ (ml } 0.1 \text{ N Alcoholic KOH)}}{\text{Grams Sample}}$$

The polyester (and polyesteramide) emulsions of the present invention are more desirably cured (as will be further discussed herein) at room temperature using cobalt octoate and aqueous methyl ethyl ketone peroxide with a substantially water insoluble metal oxide as the emulsifier. The room temperature curing system cannot be used with organic nitrogen containing bases (e.g., triethanolamine) since such bases chelate the cobalt.

B. PREPARATION OF POLYESTER RESINS

The unsaturated polyester resins useful in the present invention are usually prepared by the esterification of polybasic acids with polyhydric alcohols to give polyesters in which either the alcoholic or the acidic portion thereof posses the ethylenic unsaturation. The preferred class of unsaturated polyester resins is derived from the esterification reaction of (1) unsaturated polybasic acids, preferably in combination with saturated aliphatic or aromatic polybasic acids, and (2) polyhydric alcohols.

The unsaturated polybasic acid can be any unsaturated polybasic acid containing two or more carboxyl groups (COOH) and having at least one doubly bonded pair of adjacent carbon atoms (C = C) as a part of the aliphatic acid or aliphatic portion of the acid. The term "unsaturated polybasic acid" as defined here also includes the corresponding anhydrides which contain one less molecule of water than the straight acids, e.g., maleic anhydride is the anhydride corresponding to maleic acid.

The preferred unsaturated polybasic acids include the aliph-unsaturated, alpha, beta-dicarboxylic acids such as maleic acid, fumaric acid, itaconic acid, citraconic acid, and their corresponding anhydrides. Maleic acid or its anhydride is most preferred.

The unsaturated polybasic acid can be replaced in part with an equivalent quantity of one or more saturated polybasic acids, such as succinic, adipic, sebaic, phthalic, azelaic, tetrahydrophthalic and endomenthylene tetrahydrophthalic acids and their corresponding anhydrides. Other saturated acids include isophthalic, tetrachlorophthalic, chlorendic, hexahydrophthalic, glutaric and pimelic acids, and their corresponding anhydrides.

The polyhydric alcohols may be polyhydric alcohol or glycol having two or more hydroxy (OH) groups and which react with either type of polybasic acid to form the corresponding polyester resin. Polyhydric alcohols which can be esterified with the above-described polybasic acids include glycerol, ethylene glycol, diethylene glycol, triethylene glycol, 1,2-propylene glycol, dipropylene glycol, 1,2-butylene glycol, 1,3-butylene glycol, 1,4-butylene glycol, 2,3-butylene glycol, bisphenol A, hydrogenated bisphenol A, 1,4-butenediol, 1,5-pentanediol, 1,6-hexanediol, and neopentyl glycol. The dihydric alcohols, particularly the lower aliphatic glycols, such as ethylene glycol, propylene glycol, and diethylene glycol are preferred. Higher polyhydric alcohols such as trimethylol propane and pentaerythritol may be used in minor amounts which do not materially alter the linear nature of the polyester.

Castor oil, which is chiefly ricinolein can also be used, and may be especially advantageous where even further improvement in impact strength of the resulting polyester is desired.

The manner of making the unsaturated polyester resin from the abovedescribed polybasic acids and polyhydric alcohols is well-known and is not a part of the present invention per se. For further explanation of unsaturated polyester resins and methods for making them, see Golding, Polymers and Resins, D. Van Nostrand Co., New York (1959); and Oleesky and Mohr, *Handbook of Reinforced Plastics*, Reinhold, New York (1964), both of which are incorporated herein by reference for the sake of brevity and clarity.

C. CROSS-LINKERS

The most commonly used or thoroughly investigated monomers with which the polyesteramide or polyester resin is mixed to form the thermosetting material and which acts as cross-linkers are vinylic monomers such as styrene, methyl methacrylate, vinyl toluene, alpha-methyl styrene, dichlorostyrene, divinylbenzene, diallyalphthalate and triallyl cyanurate. Other monomers which can be used include methyl acrylate, ethyl acrylate, vinyl acetate, acrylonitrile, N-vinyl pyrrolidone, maleiamide, acrylamide, methacrylamide, diallyl succinate, diallyl itaconate, triallyl aconitate, triallyl phosphate and trichloroethylene. Styrene is preferred because of costs, availability, and the fact that it does not adversely effect the physical properties of cured compositions of these resins.

The term "monomeric styrene compound" as used herein is meant to mean styrene itself, or a polymerizable derivative thereof including vinyl toluene, alpha-methyl styrene, and ethyl substituted styrene such as alpha-ethyl styrene, and the mono- and dichloro nuclear-substituted styrenes such as 4-chloro-1-vinylbenzene.

The polyesteramide or polyester and the monomeric vinylic monomer, such as styrene compound can be mixed in widely varying weight ratios such as from about 1:10 to about 10:1 but are preferably combined in ratios of from about 3:2 to about 2:3.

When the cured mixture of polyesteramide (or polyester) and vinyl monomer must be flame retardant the polyesteramide (or polyester) and the vinyl monomer are mixed in a quantity such that the halogen content of the mixture is greater than 10 and preferably greater than 20 weight percent.

D. CURING SYSTEMS

In order to assist in the maintenance of the stability of the mixture of the polyesteramide or polyester, and vinyl monomer, a conventional free radical trap such as hydroquinone can be used. In order to cure these compositions, a free radical initiator such as benzyol peroxide, methyl ethyl ketone peroxide or azobisisobutyronitrile is added to the mixture. Accelerators such as cobalt naphthenate or cobalt octoate can also be employed, as is well known in the art.

Wide and diverse catalyst-promoter systems and curing conditions can be used with the above-described thermosetting unsaturated polyester and polyesteramide resin materials. The particular catalyst-promoter system is chosen according to the particular application of the resin and the type and time of cure desired.

In general, any free radical catalyst which can open up the double bonds in the polyester or polyesteramide linear chain to set in motion that portion of the polymerization or curing process designated as initiation is suitable. Usually, the organic peroxides are employed as catalysts in most applications of the unsaturated polyester or polyesteramide resin material and the corresponding curing conditions, e.g., temperatures and curing times, may be determined by one skilled in this art in view of the present teachings herein. For example, where it is desired to maintain low (20° – 60°C) or medium (60° – 120°C) temperatures during cure, the ketone peroxides, such as methyl ethyl ketone peroxide, cyclohexanone peroxide, and bis(1-hydro cyclohexyl) peroxide; and the diacyl peroxides such as benzoyl peroxide, lauroyl peroxide and acetyl peroxide, can be used. The catalyst used in the present invention is preferably a water soluble peroxide catalyst such as Superox 38 (water soluble methyl ethyl ketone peroxide, supplied by Reichhold Chemicals, Incorporated) or Lupersol DDM (60% methyl ethyl ketone peroxide in dimethyl phthalate, supplied by Ludicol, Div. Wallace & Tiernan, Incorporated). This catalyst is added to the water-in-oil emulsion with stirring. The time needed for cure is, of course, dependent upon the amount of peroxide catalyst present and the temperature. For example, in order to cure an aqueous or styrene solution containing 100 parts (by weight, e.g., grams) or polyester or polyesteramide solids dissolved therein, about from 1 to 8 parts (by volume, e.g., milliliters), more typically about 1 to 5 parts, and preferably about 1 to 3.5 parts of water soluble peroxide catalyst are used.

Further, certain "promoters" are often used to activate decomposition of the above-described peroxide catalysts at temperatures below the normal decomposition and activation temperature of the particular peroxide. Promoter systems for these peroxides are well-known. In the case of methyl ethyl ketone peroxide, for example, N-N-dimethyl para-toluidine, dimethyl aniline, diethyl aniline, lauryl mercaptan, cobalt naphthenate, cobalt octoate and magnesium naphthenate may be used as promoters. The promoters of present invention are preferably a mixture of dimethyl aniline and Hexogen (octoate) cobalt 12%, although they can be used independently. Hexogen (octoate) cobalt 12% is essentially an odorless petroleum solution of cobalt salts of 2-ethyl hexoic acid and is manufactured by Cincinnati Milacron Chemicals Incorporated of New Brunswick, New Jersey. "Hexogen" is a registered trademark of Cincinnati Milicron Chemicals Incorporated.

The dimethyl aniline is usually added first, with stirring, to the mixture of polyester or polyesteramide solution and emulsifier. The 12% cobalt octoate solution is then added. In general, the dimethylaniline and cobalt octoate are used in a ratio of about 1 ml of dimethyl aniline to about 2 to 2.5 g of the 12% cobalt octoate solution. Thus, for each part (in ml) of peroxide catalyst used, then from about 0.10 to 0.50 parts (ml), and preferably from about 0.25 to 0.50 parts (ml) dimethyl aniline and from about 0.30 to 1.2 parts (grams), more typically about 0.40 to 1.0 parts (grams) and preferably from about 0.50 to 0.60 parts (grams) of a 12% solution of cobalt octoate are used.

E. EMULSIFYING AGENTS

The emulsifying agent used in the present invention can be organic (e.g., "Igepal CO. 210", "Igepal CO. 430", "Surfonic N-10", "Arlacel C," "Span 80"), "Tween 80", "Abex 18-S", "Abex 26-S, or "Dowfax 2A1 Solution"), silicon containing such as sodium silicate solutions (e.g., "PQ-Silicate N") or colloidal silica solutions (e.g., "Ludox AM"), or substantially water insoluble metal oxides (e.g., zinc oxide or magnesium oxide). "Igepal CO. 210" and "Igepal CO. 430" are non-ionic surfactants produced by the General Aniline and Film Corporation of New York. These surfactants are derived from the same hydrophobic starting material -- nonylphenol. By increasing the amount hydrophylic substance, ethylene oxide, combined with the nonylphenol, a series of products with different hydrophobic-hydrophylic balances is obtained. Their chemical structure is that of a polyoxyethylated nonylphenol, illustrated by the following formula:

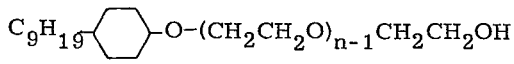

wherein "n" denotes the number of moles of ethylene oxide per mole of nonylphenol. Water solubility is directly proportional to "n". Since changes in the hydrophobic-hydrophylic balance produce important variations in wetting, detergency, emulsification, solubility, or foam, the selection of the proper balance becomes important.

"Igepal CO. 210" and "Igepal CO. 430" are clear viscous liquids. "Igepal CO. 210" has a mole ratio, "n", of 1.5 and contains 23% ethylene oxide, while "Igepal CO. 430" has a mole ratio, "n", of 4 and contains 44% ethylene oxide.

"Surfonic N-10" is a non-ionic surface active agent produced by the Jefferson Chemical Company, Incorporated, and are reaction products or adducts of nonylphenol and ethylene oxide in a molar ratio of 1:1. The average length of the hydrophylic polyoxyethylene chain is 1 oxyethylene unit.

"Arlacel C" is a registered trademark for Sorbitan Sesquioleate, a non-ionic emulsifier produced by the Atlas Chemical Industries, Incorporated, of Wilmington, Delaware.

"Tween" is the trademark for a series of general purpose emulsifiers and surface active agents which are polyoxyethylene derivatives of fatty acid partial esters of sorbitol anhydrides. "Tween 80" is a polyoxyethylene derivative of sorbitan monooleate.

"Span" is a trademark for the members of a series of general purpose emulsifiers and surface active agents which are fatty acid partial esters of sorbitol anhydrides (or sorbitan). "Span 80" consists of sorbitan monooleate. Both "Tween 80" and "Span 80" are produced by the Atlas Chemical Industries, Incorporated of Wilmington, Delaware.

"Abex" is a registered trademark (Alcolac Chemical Corporation) for anionic surfactants used in emulsion polymerization.

"Dowfax 2Al" is a registered trademark for an anionic surface active agent of the sulfonate type produced by The Dow Chemical Company of Midland, Michigan, having the structure indicated in the formula:

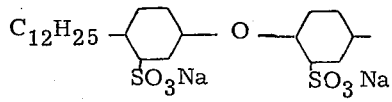

"Silicate N" is a soluble silicate composition produced by the Philadelphia Quartz Company of Philadelphia, Pennsylvania. "Silicate N" has a weight ratio of $SiO_2$ to $Na_2O$ of 3.22 and contains 8.90% $Na_2O$ and 28.7% $SiO_2$.

"Ludox AM" is the registered trademark for a colloidal silica solution which contains approximately 30% $SiO_2$, 0.2% $Al_2O_3$, 0.13% $Na_2O$, 0.006% $So_4$ as $Na_2So_4$, and 0.007% Cl as NaCl. This solution is an opalescent liquid having a pH of between 8.9 and 9.1 at 25°C.

Substantially insoluble metal oxides (such as zinc oxide or magnesium oxide) can be used as emulsifiers for both polyesters and polyesteramides. The resulting water-extended polyesters and water-extended polyesteramides have good hardness characteristics.

The use of zinc oxide or magnesium oxide as an emulsifier also enhances the fire retardancy of the cured water-extended resins, as tested with a Bunsen burner. These cured water-extended resins are typically self-extinguishing when a Bunsen burner flame is applied to a sample for about 3 minutes.

F. OTHER ADDITIVES

Methylcellulose, can also be added with an organic emulsifying agent in order to provide a smoother dispersion. The amount of methylcellulose is not critical. However, 1 part of methylcellulose to 5 parts of Arlacel C has been found satisfactory to produce a dispersion having good smoothness. The Arlacel C-methylcellulose mixture is added slowly to the polyester or polyesteramide solution. Water is then added with stirring to form a water-in-oil emulsion of the polyester or polyesteramide.

Water soluble monomers such as N-methylolacrylamide, acrylamide, and diacetone acrylamide may also be dissolved in the water phase of the water-in-oil emulsion of a polyester or polyesteramide.

Another aspect of the present invention concerns the use of a water soluble inorganic salt such as zinc borate, ammonium phosphate-dibasic, sodium chloride, sodium borate-decahydrate, and ammonium chloride as an additive which can increase the fire retardancy of water-extended resins. The inorganic salt may be mixed with the water and this mixture is added to the solution of the polyester and accelerators. When about 100 parts (grams) of polyester solution are used, then up to about 30 parts, typically from 5 to 25 parts, and preferably about 10 parts of water soluble inorganic salt are added to 100 parts of water to make up the reaction mixture. The resulting mixture is cured as described above and the cured product is self-extinguishing and may not burn when a Bunsen burner flame is applied to the sample for from about 3 minutes. Charing may occur. Eventually the samples will burn with difficulty, but only after water is driven off.

Fire retardant water-extended polyesteramide resins may also be produced by the addition of chlorine-containing, resin-soluble monomers such as vinylidene chloride and/or resin-soluble chlorinated hydrocarbons such as trichloroethylene, hexachlorobutadiene, methylene chloride, perchloroethylene, and carbon tetrachloride to the polyester or polyesteramide resin.

The addition of these chlorine containing materials can enhance the fire retardant properties of the cured product. When about 75 to 190 parts (grams) of the polyester or polyesteramide solution are used, then from about 10 to 25 parts, and preferably from about 10 to 15 parts of chlorine containing resin soluble monomers or hydrocarbon are used.

Chlorine-containing water-extended polyesteramides are more fire retardant than either chlorine containing nonwater-extended polyesteramides or nonchlorine containing water-extended polyesteramides. Indeed, it is found that a synergistic effect occurs when a chlorine containing polyesteramide resin is extended by the water emulsion technique -- i.e., a chlorine containing water-extended polyesteramide has a greater fire retardancy than one would predict from the combined fire-retardancy of the individual components (a chlorine containing polyesteramide which has not been water-extended and a water-extended polyesteramide which is not halogen containing).

G. PREPARATION OF EMULSION

The water-in-oil emulsion can be made by mixing a polymerizable organic liquid, the emulsifying agent, and water, preferably at room temperature. However, the process is not restricted to preparation of the emulsion at room temperature. Higher or lower temperatures can be used, depending on the nature and amounts of polymerizable liquid, catalyst, and promoter used. Thus, the emulsions can be prepared at temperatures ranging, for example, from about 10° to 50°C, more typically from about 20° to 40°C.

Whenever the polymerizable organic liquid is a polyesteramide or polyester solution in a vinylic cross-linking agent such as styrene, the amount of emulsifying agent mixed with or distributed throughout the solution will, of course depend on the materials used; but it should, in general, be sufficient to ensure a uniform and stable emulsion of the water or water droplets in the solution. For example, from about 1 to 20 parts, more typically from about 2 to 10 parts and preferably from about 3 to 5 parts emulsifying agent are mixed with about 100 parts of polyester or polyesteramide solution. Mixtures of two or more emulsifiers may be used where desired.

After the addition of the promoters (as described hereinabove) to the mixture of the polymerizable organic liquid and emulsifying agent, the resulting composition is then mixed with water to form a water-in-oil emulsion of the polyester or polyesteramide wherein the continuous phase comprises the polyester or polyesteramide solution and the discontinuous phase is aqueous, i.e., comprises or consists essentially of water. Up to about 300 parts of water per 100 parts of polyester or polyesteramide can be added, although from about 50 to 150 parts are ordinarily preferred. The water is typically added to the polyester or polyesteramide solution at such a rate that continuous emulsification takes place. The water must not be added so fast that it accumulates in advance of the emulsification process.

After the addition of water and the formation of a water-in-oil emulsion, the emulsion is allowed to stand to permit deaeration, e.g., for from about 15 to 30 minutes. Preferably, the emulsion is deaerated using a vacuum pump to remove any bubbles which could subsequently become part of the cured resin. Deaeration is desirable since the presence of entrapped air may inhibit cross-linking and may also lead to foaming.

H. CURING OF THE EMULSION

Curing catalyst, as described, is added, typically with agitation such as stirring, and the product is thereafter cured, e.g., added to a container or mold where curing to a white or light colored solid takes place. The curing process may be quite rapid (1 to 2 minutes) or much slower (several hours) depending upon the particular polymer curing system, and, of course, the temperature as will be evident to one skilled in the art in view of the present specification.

I. OPEN CELL WATER-EXTENDED RESINS

In addition to providing processes for the production of polymers having closed cell systems, the present invention also provides processes for the preparation of water-extended polyesters and water-extended polyesteramides that are open cell systems. The term "open cell" as used herein refers to those water-extended resins having intercommunicating pores containing water dispersed in the form of spherical drops having a diameter between less than one micron to approximately 50 microns. The spherical shape of the cells yields cells of high resistance to compression. The term "closed cell" as here used refers to resins having non-intercommunicating pores.

The present invention also provides processes for the preparation of open cell water-extended resins in which part or all of the aqueous dispersed phase can be removed after polymerization from the resulting porous plastic, for example, by drying at elevated temperature in a vacuum. Removal of the water results in a foam-like structure.

J. UTILITY

The water-extended resins of the present invention are useful as low-cost molding materials, of construction, paving and flooring materials, sound proof and insulation materials, fire wall materials, and for the construction of dikes and revetments.

For a further description of the uses and applications of water-extended polyester resins, reference is made to the articles in *Reinforced Plastics*, May, 1968, at page 260, and in *S.P.E. Journal*, Vol. 25, pg. 41 (October, 1969).

K. SPECIFIC EXAMPLES

The invention is further illustrated by the following examples; in these examples as well as in the claims and in other parts of the specification, all parts and percentages are by weight unless otherwise indicated. Room temperatures in the following examples were approximately 25°C. These non-limiting examples are illustrative of certain embodiments designed to teach those skilled in the art how to practice the invention and to represent the best mode contemplated for carrying out the invention.

EXAMPLE 1

Preparation of a polyesteramide using the mono salt of chlorendic acid and ethylenimine Preparation of the polyesteramide was accomplished in a conventional reactor (three-necked flask) equipped with thermometer, stirrer, full condenser, partial condenser to contain glycol vapors, nitrogen sparge, and source of vacuum.

In general, the procedure used to prepare the polyesteramide was to charge the salt (prepared according to the process disclosed in U.S. Pat. No. 3,676,424) and maleic anhydride to the reactor, together with xylene as an azeotroping agent. Heating the mixture resulted in reaction of the solid salt with the maleic anhydride, as evidenced by a rapid exotherm after which stage all materials were in liquid form. This first phase of the reaction was followed by determination of the amine number.

When the amine number was very low (3–5), the glycol was charged to the reactor, the temperature further elevated, and water was azeotropically distilled as the reaction proceeded. This second phase was followed by determination of acid numbers. The reaction was run until the acid number approached 25 to 50. Excess glycol, remaining water, and xylene were removed under vacuum, inhibitor was added, the product cooled, and styrene then added to give an approximately 60–70 percent solution of the polyesteramide in styrene.

More specifically, 279.93 grams (2.36 moles) of hexane diol, 60.60 grams (0.79 mole) of propylene glycol, and 290.43 grams (2.96 moles) of maleic anhydride in 250 ml of xylene were charged into a reactor and maintained under a nitrogen blanket. Heating was started and the temperature rose to 107°C over a 45 minute period. During this 45 minute period 852.81 grams (1.97 mole) of chlorendic acid ethylenimine salt was gradually added. After 45 minutes 5.5 grams of tris-(2-chloroethyl phosphite) were added. Heating was continued for another 6 hours until the temperature increased to 164°C. Vacuum (6mm mercury) was applied and any remaining water, excess glycol, or xylene were distilled over. The vacuum was removed, and 297 mg (150 ppm) of toluhydroquinone as an inhibitor were added and the reaction product cooled to 165°C at which point 582 g of styrene was added to make a 70.95% solution of the polyesteramide in styrene. The final product was filtered, resulting in a light orange colored liquid having an acid number of 19 and an amine number of 8.

Preparation of a water-extended polyesteramide using the organic emulsifier Arlacel C:

Ninety-five grams of the polyesteramide solution prepared above (reduced to a 65% solution of the polyesteramide in styrene) were weighed into a 300 ml beaker. Five grams Arlacel C emulsifier were added and mixed in slowly using a high speed stirrer. One-half milliliter of dimethyl aniline was added with stirring followed by 1.2 grams of a 12% solution of Hexogen cobalt octoate. One hundred milliliters of water were then added at such a rate that continuous emulsification took place. A stable, uniform water-in-oil emulsion was formed. The emulsion was deaerated for 15 minutes using a vacuum pump. Two milliliters of Superox 38 catalyst were added with stirring and the product was transferred to a container or mold where curing to a solid containing water in a closed cell system took place in five minutes at room temperature (approximately 25°C).

EXAMPLE 2

Preparation of a water-extended polyesteramide using an organic emulsifier (Arlacel C) and methylcellulose.

The procedure described in Example 1 was repeated, except that 94 grams of the polyesteramide solution were used. To the reaction mixture was added 1 gram of methylcellulose ("Methocel 65 HB", Dow Chemical Co.). The results were the same as in Example 1 except that the methylcellulose seemed to increase the smoothness of the dispersion, to improve stability and to result in a slightly slower curing to the non-pour stage (about 8 minutes) at room temperature.

EXAMPLE 3

Formation of a polyesteramide using excess chlorendic acid and beta-propiolactone.

To a reactor as in Example 1, was charged 76.72 g (1.01 mole) of propylene glycol, 372.62 g (3.79 mole) maleic anhydride along with 352.55 g (2.98 moles) of 1,6-hexane diol. Heating was started and the temperature rose to 130° in an exothermic reaction over a 50 minute period. At this time 369.32 g (0.94 mole) of chlorendic acid were added. This mixture was then cooled to 70°C and 68.47g (0.94 mole) of beta-propiolactone were added dropwise. Heating was continued and the temperature rose to 85° over a 45 minute period. At this time 410.30 g (0.94 mole) of chlorendic acid ethylenimine salt were added resulting in a very pale yellow solution. Heating was continued for another three hours, whereupon another 19.02 g (0.25 mole) of propylene glycol were added. The solution was again heated to 163°C over a three hour period, resulting in a product having an acid number of 42.5. Any remaining water, excess glycol or xylene were then distilled under a vacuum of 4 mm Hg.

The vacuum was removed and 734 mg (306 ppm) of mono-tertiary butyl hydroquinone (MTBHQ) were added as an inhibitor. At this point 959.6 g of styrene were added to make a 60% solution of the polyesteramide in styrene. The final product was filtered and resulted in an acid number of 36.0 and an amine number of 1.5.

Preparation of a water-extended polyesteramide using a polyoxyethylated nonylphenol organic emulsifier (Igepal CO-430):

Using equipment as in Example 1, 80 grams of the polyesteramide solution prepared above and 20 grams of extra styrene to make a 50% solids solution were weighed into a 300 ml beaker. Four grams of Igepal CO-430 were mixed in slowly using a high-speed stirrer, as in Example 1, to disperse the water and the resin into fine droplets. One-half milliliter of dimethyl aniline was added with stirring, followed by one gram of a 12% solution of Hexogen cobalt octoate. One hundred milliliters of water were then added at such a rate that continuous water-in-oil emulsification took place.

After all the water was added, the water-in-oil emulsion was deaerated for 15 minutes, using a vacuum pump. Two milliliters of Superox 38 catalyst were added with stirring (the water-in-oil emulsion did not invert) and the product was transferred to a container or mold where curing to the non-pour stage took place in 18 minutes at room temperature.

EXAMPLE 4

Preparation of a water-extended polyesteramide using a polyoxyethylated nonylphenol organic emulsifier having lower ethylene oxide content (Igepal CO-210)

The same conditions and amounts as in Example 3 were used, except for use of the above-described Igepal CO-210 emulsifier. The water-in-oil emulsion was quite stable and uniform. Curing to the non-pour stage took place in 8 minutes at room temperature.

EXAMPLE 5

Preparation of a water-extended polyesteramide using an organic emulsifier which is an oxyethylated nonylphenol having a 1:1 molar ratio of ethylene oxide to nonylphenol (Surfonic N-10):

One hundred grams of the polyesteramide solution prepared in Example 1 (adjusted to a 50% solution of the polyesteramide in styrene) were weighed into equipment as in Example 1. Four grams of Surfonic N-10 emulsifier were mixed in slowly using a high speed stirrer. Thirty-five hundredths of a milliliter of dimethyl aniline was added with stirring followed by 0.80 gram of a 12% solution of Hexogen cobalt octoate. One hundred milliliters of water were then added at such a rate that continuous emulsification took place. A stable, uniform water-in-oil emulsion was obtained.

After all the water was added, the water-in-oil emulsion was deaerated for 15 minutes using a vacuum pump and one and four tenths milliliters of Superox 38 catalyst were added with stirring and the product was transferred to a container or mold where curing to a white solid took place in ten minutes at room temperature.

EXAMPLE 6

Preparation of a general purpose polyester from propylene glycol, maleic anhydride, and phthalic anhydride:

To a reactor as in Example 1, was charged 774.00 g (10.17 moles) propylene glycol. Heating was started and 453.60 g (4.62 mole) maleic anhydride was added over a 10 minute period. At this point 684.90 g (4.62 mole) of phthalic anhydride were added. Heating was continued for another 6 hours resulting in a temperature of 210°C. The product at that point had an acid number of 27. Vacuum (4 mm mercury) was applied and any remaining water or excess glycol were distilled over. 400 mg (198 ppm) of mono-tertiary butyl hydroquinone (MTBHQ) were added, and the reaction product cooled to about 115° at which point 400 g of styrene were added to make an 80% solution of the polyester in styrene. Final acid number was 18.0.

Preparation of a water-extended polyester using the organic emulsifier Surfonic N-10:

Using equipment as in Example 1, 100 grams of the polyester solution prepared above (adjusted to a 50% solution of the polyester in styrene) were weighed into a 300 ml beaker. Four grams of Surfonic N-10 were mixed in slowly using a high-speed stirrer. Seventy-five hundredths of a milliliter of dimethyl aniline was added with stirring followed by 1.8 grams of a 12% solution of Hexagen cobalt octoate. One hundred milliliters of water were then added at such a rate that continuous emulsification took place. After all the water was added, the water-in-oil emulsion was deaerated for 15 minutes using a vacuum pump. A very stable and uniform water-in-oil emulsion was obtained.

Three milliliters of Superox 38 catalyst were added with stirring and the emulsion turned green. The product was added to a container or mold where curing to a rubbery non-pour stage took place in 4 to 5 minutes at room temperature.

EXAMPLE 7

Preparation of a water-extended polyester using a combination of organic emulsifier (Dowex 2A1 solution) and a sodium silicate emulsifier.

One hundred grams of the polyester prepared in Example 6 (a 50% solution of the polyester in styrene) were weighed into equipment as in Example 1. Five grams of PQ Silicate N emulsifier and 1 gram of Dowfax 2A1 (the disodium salt of dodecylated oxydibenzene disulfonic acid) solution were mixed in slowly using a high-speed stirrer. One-half milliliter of dimethyl aniline was added with stirring followed by 1 gram of a 12% solution of Hexagen cobalt octoate. One hundred milliliters of water were then added at such a rate that continuous emulsification took place. A good water-in-oil emulsion was obtained.

After all the water was added, the water-in-oil emulsion was deaerated for 15 minutes using a vacuum pump. One milliliter of Lupersol DDM catalyst was added with stirring and the product was transferred to a container or mold where curing to the non-pour stage took place in 2 to 3 minutes at room temperature.

EXAMPLE 8

Preparation of a polyesteramide using chlorendic acid/ethylenimine mono-salt, propylene glycol, and beta-propiolactone:

To a reactor as in Example 1 was charged 84.18g (1.10 mole) of propylene glycol and 386.70 g (3.27 moles) 1,6-hexane diol along with 409.10 g (4.17 moles) of maleic anhydride. Heating was started, producing an exothermic reaction which caused the temperature to rise to 135°C over 50 minutes. The solution was then cooled to 76°C and 75.17 g (1.04 mole) beta-propiolactone were added dropwise. Then 900.59 g (2.08 moles) of chlorendic acid ethylenimine salt were added with rapid stirring, followed by addition of 5 ml of tris(2-chloroethyl) phosphite. Heating was continued for another 6 hours to a temperature of 160°C at which time the product had an acid number of 41. Vacuum (5 mm mercury) was applied and any remaining water and excess glycol were removed by distillation. The reaction product was cooled, and 700 g of styrene were added to make a 69.74% solution of the polyesteramide in styrene. The inhibitor system added to this resin solution was 0.693 g (300 ppm) benzoquinone, 0.115 g (50 ppm) methyl ether of hydroquinone, and 0.115 g (50 ppm) tertiary-butyl catechol.

Preparation of a water-extended polyesteramide using a sodium silicate solution as an emulsifier.

Ninety-eight grams of the polyesteramide solution prepared above (adjusted by addition of styrene to a 60% solution of the polyesteramide in styrene) were weighed into equipment as in Example 1. Two grams of PQ Silicate N emulsifier were mixed in slowly using a high speed stirrer. One-half milliliter of dimethyl aniline was added with stirring followed by 1.2 grams of a 12% solution of Hexagen cobalt octoate. One hundred milliliters of water were then added at such a rate that a continuous emulsification took place. A very stable, uniform water-in-oil emulsion was obtained.

After all the water was added, the water-in-oil emulsion was deaerated for 15 minutes using a vacuum pump. Two milliliters of Superox 38 catalyst were added with stirring and the product was transferred to a container or mold where curing to the non-pour stage took place in 2 to 3 minutes at room temperature.

EXAMPLE 9

Preparation of a general purpose polyester resin from maleic anhydride, propylene glycol, and phthalic anhydride:

To a reactor as in Example 1, 671.60 g (6.84 moles) maleic anhydride, 821.00 g (10.78 moles) propylene glycol, and 507.40 g (3.42 moles) of phthalic anhydride were added. This mixture was heated for 12 hours to a temperature of 200°C and until the acid number was 48. Vacuum (4 mm mercury) was applied and any remaining water or excess glycol was distilled off. The vacuum was removed, and 367 mg (150 ppm) MTBHQ were added and the reaction product cooled to 115°C at which point 611 g of styrene were added to make a 74% solution of the polyester in styrene.

Preparation of a water-extended polyester using zinc oxide as an emulsifier.

One hundred grams of the polyester solution prepared above (adjusted with additional styrene to a 50% solution of the polyester in styrene) were weighed into the equipment of Example 1. Four grams of zinc oxide were mixed in slowly using a high speed stirrer. Thirty-five hundredths of a milliliter of dimethyl aniline was then added with stirring, followed by 0.84 grams of a 12% solution of hexagen cobalt octoate. One hundred milliliters of water were then added at such a rate that continuous emulsification took place. After all the water was added, the water-in-oil emulsion was deaerated for 15 minutes using a vacuum pump. A very stable and uniform water-in-oil emulsion was obtained. Then 1.4 mls of Superox 38 catalyst were added with stirring and the product was transferred to a container or mold where curing to the non-pour stage took place in 2 to 3 minutes at room temperature. The water-extended polyester thus formed was self-extinguishing when tested with a Bunsen burner flame.

EXAMPLE 10

Preparation of a water-extended polyester using sodium silicate as an emulsifier.

One hundred grams of the polyester solution prepared in Example 6 (a 50% solution of the polyester in styrene) were weighed into equipment as in Example 1. Five grams of PQ Silicate N emulsifier were mixed in slowly using a high speed stirrer. One-half milliliter of dimethyl aniline was added with stirring followed by one gram of a 12% solution of Hexagen cobalt octoate. One hundred milliliters of water were then added at such a rate that continuous emulsification took place. A stable and uniform water-in-oil emulsion was obtained.

After all the water was added, the water-in-oil emulsion was deaerated for 15 minutes using a vacuum pump. One milliliter of Superox 38 catalyst was added with stirring and the product was transferred to a container or mold where curing to the non-pour stage took place in 2 to 3 minutes at room temperature.

EXAMPLE 11

Preparation of a water-extended polyesteramide using a sodium silicate emulsifier (such as PQ Silicate N) and also using a 60% water solution of methylol acrylamide as the aqueous phase.

One hundred grams of the polyesteramide prepared in Example 1 (a 50% solution of the polyesteramide in styrene) were weighed into equipment as in Example 1. Four grams of PQ Silicate N emulsifier were mixed in slowly using a high speed stirrer. Thirty-five hundredths of a milliliter of dimethyl aniline was added with stirring followed by 0.84 gram of a 12% solution of Hexagen cobalt octoate. Twenty milliliters of a 60% solution of methylol acrylamide in water were mixed with 92 milliliters of water. This aqueous solution was added to the polyesteramide solution at such a rate that continuous emulsification took place. A stable and uniform water-in-oil emulsion was obtained.

After all the aqueous solution was added, the water-in-oil emulsion was deaerated for 15 minutes using a vacuum pump. One and four tenths milliliters of Superox 38 catalyst were added with stirring and the product was transferred to a container or mold where curing to the non-pour stage took place in 6 minutes at room temperature. The cured sample was very light beige and had no surface defects.

EXAMPLE 12

Preparation of a water-extended polyester using a colloidal silica solution (Ludox AM) as emulsifier.

One hundred grams of the polyester prepared in Example 6 (a 50% solution of the polyester in styrene) were weighed into equipment as in Example 1. Fifteen grams of Ludox AM emulsifier were mixed in slowly using a high speed stirrer. One-half milliliter of dimethyl aniline was then added with stirring followed by one gram of a 12% solution of Hexagen cobalt octoate. Ninety milliliters of water were then added at such a rate that continuous emulsification took place. A very stable and uniform water-in-oil emulsion was obtained.

After all the water was added, the water-in-oil emulsion was deaerated for 15 minutes using a vacuum pump. One milliliter of Lupersol DDM catalyst was added with stirring and the product was transferred to a container or mold where curing to the non-pour stage took place in 2 to 3 minutes at room temperature. The cured sample was grey and had a rubber-like appearance.

EXAMPLE 13

Preparation of a water-extended polyesteramide using a colloidal silica solution (Ludox AM) as emulsifier.

One hundred grams of the polyesteramide prepared in Example 1 (a 50% solution of the polyesteramide in styrene) were weighed into equipment as in Example 1. Fifteen grams of Ludox AM emulsifier were mixed in slowly using a high speed stirrer. One-half milliliter of dimethyl aniline was then added with stirring, followed by 1.2 grams of a 12% solution of Hexagen cobalt octoate. Ninety milliliters of water were then added as in Example 1 at such a rate that a continuous emulsification took place. A very stable and uniform water-in-oil emulsion was obtained.

After all the water was added, the water-in-oil emulsion was deaerated for 15 minutes using a vacuum pump. Two milliliters of Superox 38 catalyst were added with stirring and the product was transferred to a container or mold where curing to a white solid took place in 2 to 3 minutes at room temperature.

Example 14

Preparation of a water-extended polyesteramide using an organic emulsifier and an aqueous solution of a diacetone acrylamide.

Eighty grams of the polyesteramide prepared in Example 1 (a 60% solution of polyesteramide in styrene) were weighed into equipment as in Example 1. Five grams of Arlacel C and 1 gram of Methocel 65 HG were mixed in slowly using a high speed stirrer. One-half milliliter of dimethyl aniline was then added with stirring followed by 1.2 grams of a 12% solution of Hexagen cobalt octoate. An aqueous solution of diacetone acrylamide, obtained by mixing 14 grams of diacetone acrylamide with 100 grams of water, was then added at such a rate that continuous emulsification took place. After all the water was added, the water-in-oil emulsion was deaerated for 15 minutes using a vacuum pump. A stable, uniform water-in-oil emulsion was obtained.

Two milliliters of Superox 38 catalyst were added with stirring and the product was transferred to a container or mold where curing to the non-pour stage took place in 3 to 4 minutes at room temperature.

EXAMPLE 15

Preparation of a water-extended polyesteramide using an organic emulsifier (Igepal CO-210) and an aqueous solution of N-methylol acrylamide.

One hundred grams of the polyesteramide as prepared in Example 1 (a 50% solution of the polyesteramide in styrene) were weighed into equipment as in Example 1. Four grams of Igepal CO-210 emulsifier were mixed in slowly using a high speed stirrer. Thirty-five hundredths of a milliliter of dimethyl aniline was then added with stirring followed by 0.84 grams of a 12% solution of Hexagen cobalt octoate. An aqueous solution of N-methylol acrylamide, obtained by mixing 10 milliliters of a 60% solution of N-methylol acrylamide in water with 96 milliliters of water, was then added to the polyesteramide solution at such a rate that continuous emulsification took place. After all the aqueous solution was added, the water-in-oil emulsion was deaerated for 15 minutes using a vacuum pump. A stable and uniform water-in-oil emulsion was obtained.

One and four-tenths milliliters of Superox 38 catalyst was added with stirring and the product was transferred to a container or mold where curing to a smooth light beige solid took place in about 18 minutes at room temperature.

EXAMPLE 16

Preparation of a water-extended polyester using an inorganic salt (zinc borate) as a fire retardant in the aqueous phase.

One hundred grams of 32-180 Polylite unsaturated polyester resin containing cobalt and dimethyl aniline and produced by Reichhold Chemicals, Inc. of White Plains, New York, were weighed into equipment as in Example 1. Ten grams of zinc borate ("Firebrake ZB") followed by 100 ml of water were then added at such a rate that a continuous emulsification took place. After all the water was added, the water-in-oil emulsion was deaerated for 15 minutes using a vacuum pump. A stable, uniform water-in-oil emulsion was obtained.

One milliliter of Superox 38 catalyst was added with stirring and the product was transferred to a container or mold where curing to the non-pour stage took place in 2 to 3 minutes at room temperature.

This water-extended polyester was self-extinguishing when tested with a Bunsen burner flame impinging on it for 3 minutes. The sample had better fire retardancy than similar material made without zinc borate.

EXAMPLE 17

Preparation of a water-extended polyester using an inorganic salt (dibasic ammonium phosphate) in the aqueous phase.

One hundred grams of 32-180 Polylite resin were weighed out in equipment as in Example 16. An aqueous solution of dibasic ammonium phosphate, prepared by adding 10 grams of dibasic ammonium phosphate to 100 ml of water and stirring, was then added to the polyester solution at such a rate that continuous emulsification took place. After all the aqueous solution was added, the water-in-oil emulsion was obtained.

Two milliliters of Superox 38 catalyst were added with stirring and the product was transferred to a container or mold where curing to the non-pour stage took place in 5 to 6 hours at room temperature.

This water-extended polyester was self-extinguishing with a Bunsen burner and was much more fire retardant than a control material which was identical except that it contained no ammonium phosphate.

EXAMPLE 18

Preparation of a water-extended polyester using a solution of sodium chloride as the aqueous phase.

One hundred grams of 32-180 Polylite resin were weighed as in Example 16. A solution of 10 grams of sodium chloride in 100 milliliters of water solution was then added to the polyester solution at such a rate that continuous emulsification took place. After all the aqueous sodium chloride solution was added, the water-in-oil emulsion was deaerated for 15 minutes using a vacuum pump. One milliliter of Superox 38 catalyst was then added with stirring. The product was transferred to a container or mold where curing to the non-pour stage took place in 2 to 3 minutes at room temperature.

This water-extended polyester was self-extinguishing when tested with a Bunsen burner flame.

EXAMPLE 19

Preparation of a water-extended polyester using a solution of sodium borate decahydrate as the aqueous phase.

One hundred grams of 32-180 Polylite resin were weighed into equipment as in Example 16. A solution of 10 grams of sodium borate decahydrate in 100 milliliters of water was then added to the polyester solution at such a rate that continuous emulsification took place. After all of the aqueous solution was added, the water-in-oil emulsion was deaerated for 15 minutes using a vacuum pump. A stable, uniform water-in-oil emulsion was obtained.

One milliliter of Superox 38 catalyst was then added with stirring and the product was transferred to a container or mold where curing to the non-pour stage took place very rapidly (about 1 minute) at room temperature. This water-extended resin was self-extinguishing when tested with a Bunsen burner flame for about three minutes.

EXAMPLE 20

Preparation of a water-extended polyester using a solution of ammonium chloride as the aqueous phase.

One hundred grams of 32-180 Polylite resin were weighed into equipment as in Example 16. A solution of 10 grams of ammonium chloride in 100 milliliters of water was then added at such a rate that continuous emulsification took place. After all the aqueous solution was added, the water-in-oil emulsion was deaerated for 15 minutes using a vacuum pump. A stable, uniform water-in-oil emulsion was obtained.

One milliliter of Superox 38 catalyst was then added with stirring and the product was transferred to a container or mold where curing to the non-pour stage took place in 2 to 3 minutes at room temperature.

The water-extended polyester was self-extinguishing when tested with a Bunsen burner flame.

EXAMPLE 21

Preparation of water-extended polyesteramide using vinylidine chloride as a fire retardant.

One hundred and ninety grams of the polyesteramide solution prepared substantially according to the procedure of Example 8 were weighed out as in Example 1. Six grams of vinylidine chloride were added with stirring. Four grams of PQ Silicate N emulsifier were mixed in slowly using a high speed stirrer. One-half milliliter of dimethyl aniline was then added with stirring followed by 1.0 gram of a 12% solution of Hexagen cobalt octoate. Two hundred milliliters of water were then added at such a rate that continuous emulsification took place. A stable, uniform water-in-oil emulsion was obtained.

Two milliliters of Superox 38 catalyst were added with stirring and the product was transferred to a container or mold where curing to the non-pour stage took place in 8 to 10 minutes at room temperature. No odor of vinylidine chloride was detected.

EXAMPLE 22

Preparation of a water-extended polyesteramide using trichloroethylene as a fire retardant.

Eighty grams of a polyesteramide solution prepared as in Example 21 (a 60% solution of the polyesteramide in styrene) were weighed into equipment as in Example 1. Twenty grams of trichloroethylene were added. Two grams of PQ Silicate N emulsifier were mixed in slowly, using a high speed stirrer. One-half milliliter dimethyl aniline was added with stirring followed by 1.0 gram of a 12% solution of Hexagen cobalt octoate. One hundred milliliters of water were added as in Example 1 at such a rate that continuous emulsification took place. A stable, uniform water-in-oil emulsion was obtained.

Two milliliters of Superox 38 catalyst were added with stirring and the product was transferred to a container or mold where curing to the non-pour stage took place in 1 to 2 minutes at room temperature.

There was no detectable odor of trichloroethylene present. When a surface of the cured solid was exposed by sawing, a faint odor of trichloroethylene was detected.

EXAMPLE 23

Example 22 was repeated, using hexachlorobutadiene in place of trichloroethylene. Similar results were obtained.

EXAMPLE 24

Example 22 was repeated, using methylene chloride in place of trichloroethylene. Similar results were obtained.

EXAMPLE 25

Example 22 was repeated, using perchloroethylene in place of trichloroethylene. Similar results were obtained.

EXAMPLE 26

Example 22 was repeated, using carbon tetrachloride in place of trichloroethylene. Similar results were obtained.

EXAMPLE 27

Preparation of a water-extended polyester using trichloroethylene.

Seventy-five grams of 32–180 Polylite polyester were weighed into equipment as in Example 1. Twenty-five grams of trichloroethylene were added. Four-tenths milliliter of dimethyl aniline was then added with stirring. One hundred milliliters of water were then added at such a rate that continuous emulsification took place. A stable, uniform water-in-oil emulsion was obtained.

Two milliliters of Superox 38 catalyst were added with stirring and the product was transferred to a container or mold where curing to the non-pour stage took place in 3 to 5 minutes at room temperature. The mixture was a rubbery material which became harder within the next 12 hours.

The final product was elastomeric and was self-extinguishing when tested with a Bunsen burner flame. A similar run using the same starting polyester but without trichloroethylene produced a cured water-extended material that was not self-extinguishing. The bulk of the trichloroethylene is thought to have been polymerized into the system because the rubbery product had no trichloroethylene odor.

EXAMPLE 28

Preparation of an open-cell resin from a water-extended polyester.

One hundred grams of the polyester prepared in Example 9 (a 50% solution of the polyester in styrene) were weighed into the equipment of Example 1. Four grams of PQ Silicate N emulsifier were mixed in slowly using a high speed stirrer. Thirty-five hundredths of a milliliter of dimethyl aniline was added with stirring, followed by 100 milliliters of water. A water-in-oil emulsion was obtained. Addition of 0.84 grams of a 12% solution of Hexagen cobalt octoate caused inversion to an oil-in-water emulsion.

Four-tenths milliliter of Superox 38 catalyst was added with stirring and curing took place in 1 to 2 minutes at room temperature, resulting in a cured solid with a very coarse open-cell structure. Water readily drained out of this open-celled structure; but did not do so from the closed-cell structures of preceding Examples 1 to 27.

EXAMPLE 29

Preparation of a foam-like open cell water-extended polyesteramide.

One hundred grams of the polyesteramide prepared in Example 1 (a 70% solution of the polyesteramide in styrene) were weighed into the equipment of Example 1. Ten grams of Span 80-Tween 80 (HLB = 5) were mixed in slowly using a high speed stirrer. One-half milliliter of dimethyl aniline was then added with stirring, followed by 1.2 grams of a 12% solution of Hexagen cobalt octoate.

One hundred milliliters of water were then added at such a rate that continuous emulsion took place. After all the water was added, the water-in-oil emulsion was deaerated for 15 minutes using a vacuum pump. A water-in-oil emulsion was obtained.

Two milliliters of Lupersol DDM catalyst were added with stirring and the product was cured to the non-pour stage in 1½ hours at room temperature. At this point approximately 40 milliliters of water drained from the open cell structure. Oven drying (150°F) resulted in removal of the remaining water, leaving 100 grams of foam-like solid. The material could be sawed. On examination with a low power magnifying glass, the sample was seen to have an open cell structure.

EXAMPLE 30

Preparation of a water-extended polyesteramide using magnesium oxide as an emulsifier.

One hundred grams of the polyesteramide prepared in Example 1 (a 50% solution of the polyesteramide in styrene) were weighed into the equipment of Example 1. Eight-tenths of a gram of magnesium oxide (calcined) were mixed in slowly using a high speed stirrer. Thirty-five hundredths of a milliliter of dimethyl aniline was then added with stirring followed by 0.84 grams of 12% solution of Hexagen cobalt octoate. One hundred milliliters of water were then added at such a rate that continuous emulsification took place. After all the water was added, the water-in-oil emulsion was deaerated for 15 minutes using a vacuum pump. A stable, uniform water-in-oil emulsion was obtained. One milliliter of Superox 38 catalyst was added with stirring and the product was transferred to a container or mold where curing to the non-pour stage took place in 15 to 20 minutes at room temperature.

The water-extended polyesteramide thus produced was self-extinguishing when tested with a Bunsen burner flame.

EXAMPLE 31

Further preparation of a water-extended polyester with zinc oxide as an emulsifier.

One hundred grams of the polyester solution prepared in Example 6 (a 50% solution of the polyester in styrene) were weighed into the equipment of Example 1. Four grams of zinc oxide were mixed in slowly using a high speed stirrer. Thirty-five hundredths of a milliliter of dimethyl aniline was added with stirring followed by 0.84 grams of a 12% solution of Hexagen cobalt octoate. One hundred milliliters of water were then added at such a rate that continuous emulsification took place. After all the water was added, the water-in-oil emulsion was deaerated for 15 minutes using a vacuum pump. A very stable, uniform water-in-oil emulsion was obtained. One and four-tenths of a milliliter of Superox 38 catalyst was added with stirring and the product was transferred to a container or mold where curing to the non-pour stage took place in 2 to 3 minutes at room temperature.

The product exhibited very little surface tackiness due to air inhibition and was self-extinguishing when tested with a Bunsen burner flame. However, this material was not as fire-retardant as the water-extended polyester formed in Example 9.

EXAMPLE 32

Preparation of a water-extended polyester using magnesium oxide as an emulsifier.

One hundred grams of the polyester solution prepared in Example 9 (a 50% solution of the polyester in styrene) were weighed into the equipment of Example 1. Two grams of magnesium oxide (calcined) were mixed in slowly using a high speed stirrer. Thirty-five hundredths of a milliliter of dimethyl aniline was added with stirring followed by 0.84 milliliter of a 12% solution of Hexagen cobalt octoate. One hundred milliliters of water were then added at such a rate that continuous emulsification took place. After all the water was added, the water-in-oil emulsion was deaerated for 15 minutes using a vacuum pump. A very stable, uniform water-in-oil emulsion was obtained.

One and four-tenths milliliters of Superox 38 catalyst was added with stirring and the product was transferred to a container or mold where curing to the non-pour stage took place in 14 minutes at room temperature.

This water-extended polyester was self-extinguishing when tested with a Bunsen burner flame.

The principles, prefferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. A stable water-in-oil emulsion consisting essentially of a polyesteramide resin as the continuous phase and water as the discontinuous phase, the polyesteramide resin having a polymer backbone consisting essentially of repeating units having recurring ester and amide linkages between the units and wherein the polyesteramide consists essentially of at least one member selected from the group consisting of
A. polyesteramides consisting essentially of repeating units represented by the structural formula

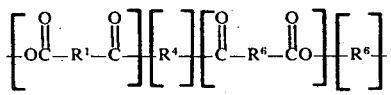

wherein:
R$^1$ is a divalent radical selected from the group consisting of alkylene, cycloalkylene, cycloalkenylene, arylene, and aralkylene, wherein one or more of the hydrogen atoms thereof can be substituted by F, Cl, Br, lower alkyl and/or lower alkoxy;
R$^4$ is aminoalkyleneoxy or oxyalkyleneamine;
R$^5$ is alpha-beta ethylenicaly unsaturated alkenylene; and
R$^6$ is alkylene,
B. polyesteramide consisting essentially of repeating units represented by the structural formula

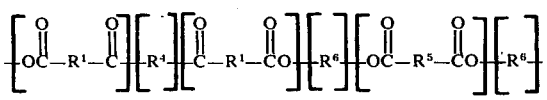

wherein R$^1$, R$^4$, R$^5$ and R$^6$ have the meanings given above;
C. polyesteramides consisting essentially of repeating units represented by the structural formula

wherein R$^1$, R$^4$, R$^5$ and R$^6$ have the meanings given above; and
D. polyesteramides consisting essentially of repeating units represented by the structural formula

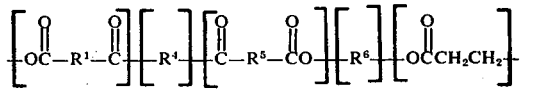

wherein R$^1$, R$^4$, R$^5$ and R$^6$ have the meanings given above.

2. A solid, cross-linked, thermoset water-extended polyesteramide resin composition, the composition also containing a vinylic monomer in an amount sufficient to cross-link the polyesteramide, and the polyesteramide resin having a polymer backbone consisting essentially of repeating units having recurring ester and amide linkages between the units and wherein the polyesteramide consists essentially of at least one member selected from the group consisting of
A. polyesteramides consisting essentially of repeating units represented by the structural formula

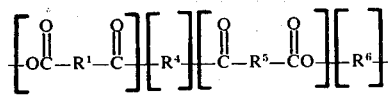

wherein:
R$^1$ is a divalent radical selected from the group consisting of alkylene, cycloalkylene, cycloalkenylene, arylene, and aralkylene, wherein one or more of the hydrogen atoms thereof can be substituted by F, Cl, Br, lower alkyl and/or lower alkoxy;
R$^4$ is aminoalkyleneoxy or oxyalkyleneamino;
R$^5$ is alpha-beta ethylenically unsaturated alkenylene; and
R$^6$ is alkylene,
B. polyesteramides consisting essentially of repeating units represented by the structural formula

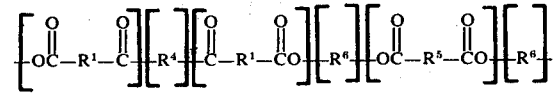

wherein R$^1$, R$^4$, R$^5$ and R$^6$ have the meanings given above;
C. polyesteramides consisting essentially of repeating units represented by the structural formula

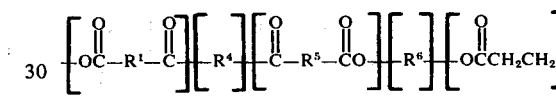

wherein R$^1$, R$^4$, R$^5$ and R$^6$ have the meanings given above; and
D. polyesteramides consisting essentially of repeating units represented by the structural formula

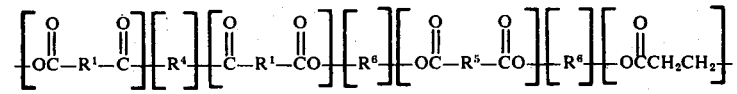

wherein R$^1$, R$^4$, R$^5$ and R$^6$ have the meanings given above.

3. A process for producing a room temperature thermoset, water-extended polyesteramide resin composition having improved fire retardancy, which process consists essentially of
a. mixing from about 1 to 10 parts of at least one emulsifying agent selected from the group consisting of zinc oxide and magnesium oxide, the emulsifying agent being present in an amount effective to emulsify the water in the polyesteramide resin, with 100 parts of a styrene solution of a polyesteramide wherein the ratio of polyesteramide to styrene is about from 1:10 to about 10:1 respectively said polyesteramide being a member selected from the group consisting of
A. a polyesteramide consisting essentially of repeating units represented by the formula

wherein:
R$^1$ is a divalent radical selected from the group consisting of alkylene, cycloalkylene, cycloalkenylene, arylene, and aralkylene, wherein one or more of the hydrogen atoms thereof can be substituted by F, Cl, Br, lower alkyl and/or lower alkoxy;
$R^4$ is aminoalkyleneoxy or oxyalkyleneamino;
$R^5$ is alpha-beta ethylenically unsaturated alkenylene; and
$R^6$ is alkylene;

B. polyesteramides consisting of repeating units represented by the structural formula

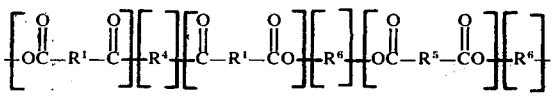

wherein $R^1$, $R^4$, $R^5$ and $R^6$ have the same meaning as above;

C. polyesteramides consisting essentially of repeating units represented by the structural formula

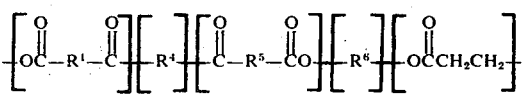

wherein $R^1$, $R^4$, $R^5$ and $R^6$ have the meanings given above; and

D. polyesteramides consisting essentially of repeating units represented by the structural formula

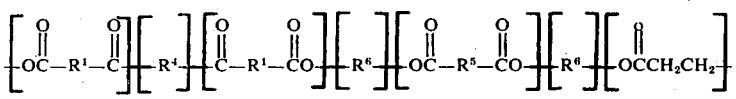

wherein $R^1$, $R^4$, $R^5$ and $R^6$ have the same meanings as above, b. adding from 10 to 300 parts of water to the mixture resulting from step (a) above to form a water-in-oil emulsion of the polyesteramide wherein the continuous phase is the styrene solution of the polyesteramide and the discontinuous phase comprises water; and c. curing to solidify and cross-link the polyesteramide emulsion at a temperature of from about 20°C to about 40°C to produce the thermoset composition.

4. A solid, cross-linked, thermoset water-extended polyesteramide resin composition containing at least one water soluble inorganic salt selected from the group consisting of zinc borate, ammonium phosphate-dibasic, sodium chloride, sodium boratedecahydrate, and ammonium chloride, the water soluble inorganic salt being present in an amount effective to increase fire retardancy of the composition, the polyesteramide resin having a polymer backbone consisting essentially of repeating units having recurring ester and amide linkages between the units and wherein the polyesteramide consists essentially of at least one member selected from the group consisting of A. polyesteramides consisting essentially of repeating units represented by the structural formula

wherein:

$R^1$ is a divalent radical selected from the group consisting of alkylene, cycloalkylene, cycloalkenylene, arylene, and aralkylene, wherein one or more of the hydrogen atoms thereof can be substituted by F, Cl, Br, lower alkyl and/or lower alkoxy;
$R^4$ is aminoalkyleneoxy or oxyalkyleneamino;
$R^5$ is alpha-beta ethylenically unsaturated alkenylene; and
$R^6$ is alkylene, B. polyesteramides consisting essentially of repeating units represented by the structural formula

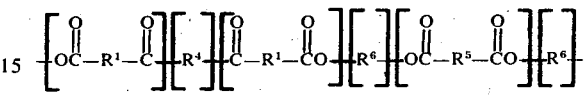

wherein $R^1$, $R^4$, $R^5$ and $R^6$ have the meanings given above;

C. polyesteramides consisting essentially of repeating units represented by the structural formula

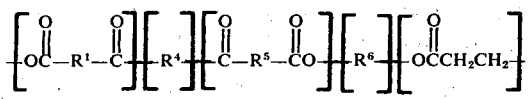

wherein $R^1$, $R^4$, $R^5$ and $R^6$ have the meanings given above; and

D. polyesteramides consisting essentially of repeating units represented by the structural formula

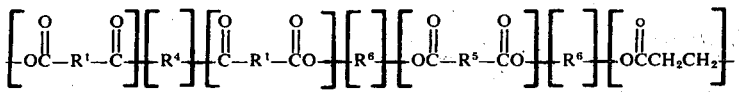

wherein $R^1$, $R^4$, $R^5$ and $R^6$ have the meanings given above.

5. A solid, cross-linked, thermoset water-extended polyeateramide resin composition containing at least one chlorinated hydrocarbon selected from the group consisting of vinylidene chloride, trichloroethylene, and carbon tetrachloride, the chlorinated hydrocarbon being present in an amount sufficient to increase fire retardancy of the composition, the polyesteramide resin having a polymer backbone consisting essentially of repeating units having recurring ester and amide linkages between the units and wherein the polyesteramide consists essentially of at least one member selected from the group consisting of A. polyesteramides consisting essentially of repeating units represented by the structural formula

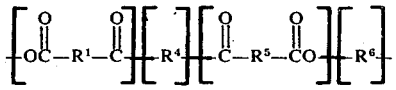

wherein:

$R^1$ is a divalent radical selected from the group consisting of alkylene, cycloalkylene, cycloalkenylene, arylene, and aralkylene, wherein one or more of the hydrogen atoms thereof can be substituted by F, Cl, Br, lower alkyl and/or lower alkoxy;
$R^4$ is aminoalkyleneoxy or oxyalkyleneamino;

$R^5$ is alpha-beta ethylenically unsaturated alkenylene; and
$R^5$ is alkylene, B. polyesteramides consisting essentially of repeating units represented by the structural formula

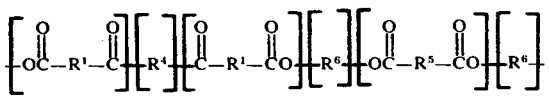

wherein $R^1$, $R^4$, $R^5$ and $R^6$ have the meanings given above;

C. polyesteramides consisting essentially of repeating units represented by the structural formula

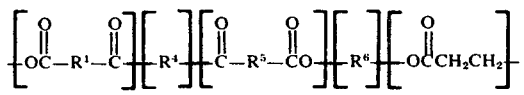

wherein $R^1$, $R^4$, $R^5$ and $R^6$ have the meanings given above; and

D. polyesteramides consisting essentially of repeating units represented by the structural formula

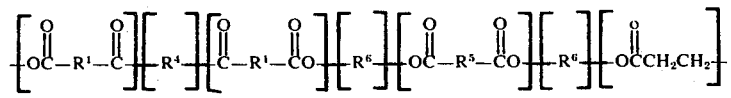

wherein $R^1$, $R^4$, $R^5$ and $R^6$ have the meanings given above.

6. An emulsion according to claim 1 wherein:
$R^1$ is tetrachlorophenylene, tetrabromophenylene, or

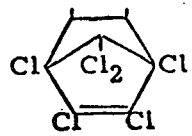

$R^4$ is

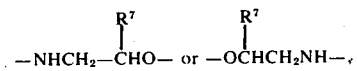

wherein $R^7$ is hydrogen or lower alkyl;
$R^5$ is

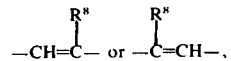

wherein $R^8$ is hydrogen or lower alkyl; and $R^6$ is lower alkylene.

7. A water-extended polyesteramide resin composition according to claim 2, wherein
$R^1$ is tetrachlorophenylene, tetrabromophenylene or

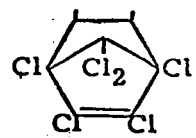

$R^4$ is

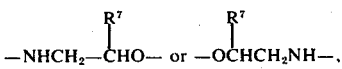

wherein $R^7$ is hydrogen or lower alkyl; $R^5$ is

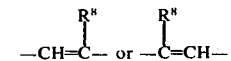

wherein $R^8$ is hydrogen or lower alkyl; and $R^6$ is lower alkylene.

* * * * *

UNITED STATES PATENT OFFICE
CERTIFICATE OF CORRECTION

Patent No. 3,975,348  Dated August 17, 1976

Inventor(s) Ray C. Christena

It is certified that error appears in the above-identified patent and that said Letters Patent are hereby corrected as shown below:

In claim 1, at line 14 of column 29, in the structural formula appearing in step A., delete "$R^6$" (first occurrence) and insert therefor -- $R^5$ -- .

In claim 3, at line 7 of column 31, after "consisting" insert -- essentially -- .

Signed and Sealed this

Twenty-eighth Day of December 1976

[SEAL]

Attest:

RUTH C. MASON  
Attesting Officer

C. MARSHALL DANN  
Commissioner of Patents and Trademarks